United States Patent [19]
Cross

[11] 3,746,119

[45] July 17, 1973

[54] ROLL JOINT STEERING

[75] Inventor: John W. Cross, San Jose, Calif.

[73] Assignee: Lockhead Aircraft Corporation, Burbank, Calif.

[22] Filed: Aug. 25, 1971

[21] Appl. No.: 174,853

[52] U.S. Cl.................. 180/42, 280/111, 280/95 R
[51] Int. Cl.............................................. B62d 7/08
[58] Field of Search.................... 180/42, 51, 24; 280/111, 112, 95, 93, 87

[56] References Cited
UNITED STATES PATENTS

| | | | |
|---|---|---|---|
| 3,161,172 | 12/1964 | Kassbohrer | 280/91 X |
| 3,183,991 | 5/1965 | Gamaunt | 280/91 X |
| 3,189,117 | 6/1965 | Ammon | 180/51 |

*Primary Examiner*—Kenneth H. Betts
*Attorney*—Paul F. Morgan and George C. Sullivan

[57] ABSTRACT

A vehicular steering arrangement is provided which is substantially unaffected and uncontaminated by a rolling relationship between separate chassis portions of the vehicle. Steering gear on one chassis portion provides accurate mechanical steering on a separate and relatively rotatable chassis portion without passing any portion of the steering connecting apparatus through the roll axis between the two chassis portions. The steering apparatus between the two chassis portions has a compact freely rotatable interconnection effectively concentric with the roll axis. Steering motion is provided by the translation of this rotatable interconnection transverse the roll axis. A continuous passageway is provided therethrough to allow an interchassis drive shaft to pass directly along the inter-chassis roll axis inside the rotatable interconnection.

12 Claims, 5 Drawing Figures

Patented July 17, 1973

JOHN W. CROSS
*INVENTOR.*

BY *George A. Sullivan*
Agent

*Paul F. Morgan*
Attorney

JOHN W. CROSS
INVENTOR.

BY George Sullivan
Agent

Paul F. Morgan
Attorney

JOHN W. CROSS
INVENTOR.

BY

Agent

Paul F. Morgan
Attorney

ROLL JOINT STEERING

The invention relates to an improved steering arrangement and steering interconnection between rollably interconnected chassis portions of a vehicle, which steering interconnection substantially eliminates the effect of inter-vehicular roll on the vehicular steering. The invention provides a simple and compact steering mechanism by which a driver on one section of a multi-section vehicle may steer the wheels (or other ground engagement means) on one or more of the other sections without relative roll between the sections causing undesirable wheel turning with consequent wheel scuffing or undesired steering actions.

This steering problem is recognized in the art. For example in U.S. Pat. No. 3,183,991 at Column 12 it is stated that the result of interchassis roll on the steering is the delivery of a spurious rotary input of the steering mechanism which does not arise from, or correspond to, the motion of the steering wheel. Various attempted solutions to the problem in the prior art include those of the above-cited patent as well as the longitudinal push-pull arrangements illustrated in U.S. Pat. Nos. 3,002,301 and 3,471,116 (note Columns 5 and 6 and FIGS. 14 and 16). However, these arrangements have various limitations and disadvantages, particularly where a compact design within space limitations is required. The present steering arrangement is particularly well suited to incorporation as a compact part of a compact interchassis roll joint between closely adjacent chassis portions. It provides positive mechanical steering without requiring any hydraulic components.

Further objects, features and advantages of the invention pertain to the particular arrangement and structure whereby the above mentioned aspects of the invention are attained. The invention will be better understood by reference to the following description and to the drawings forming a part thereof, wherein.

Figure 1:
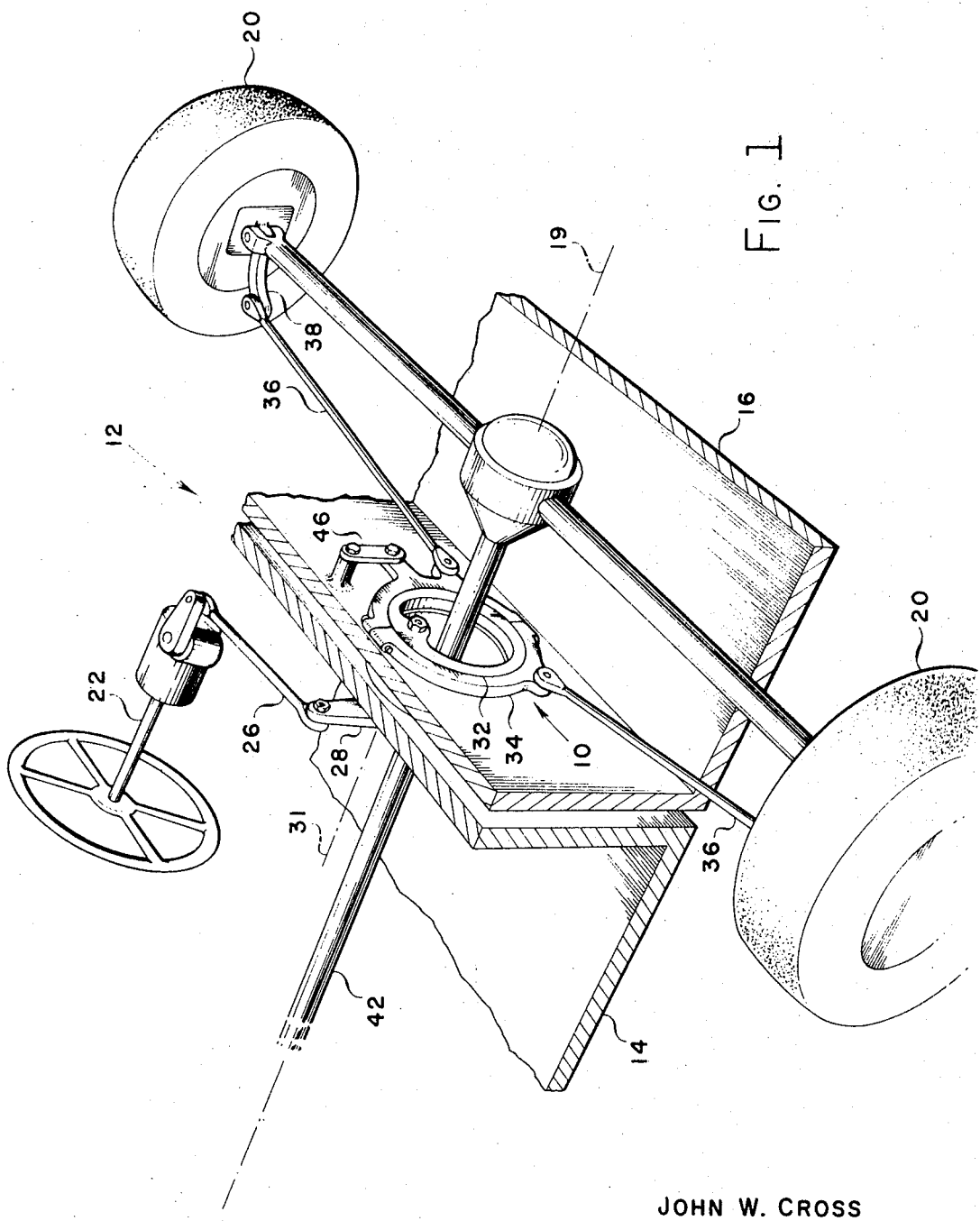
FIG. 1 is a partially schematicized perspective view of an exemplary steering arrangement in accordance with the present invention on a schematicized portion of an exemplary two-section vehicle.
Figure 3:
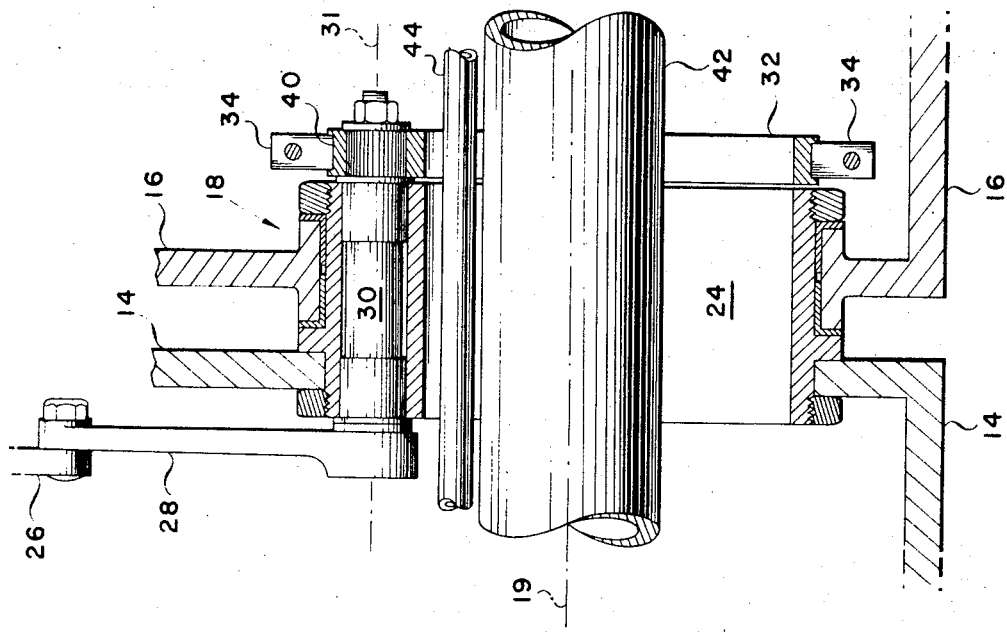
FIG. 3 is a cross-sectional view taken along the vehicle roll axis, along the line 3—3 of FIG. 2.
Figure 2:
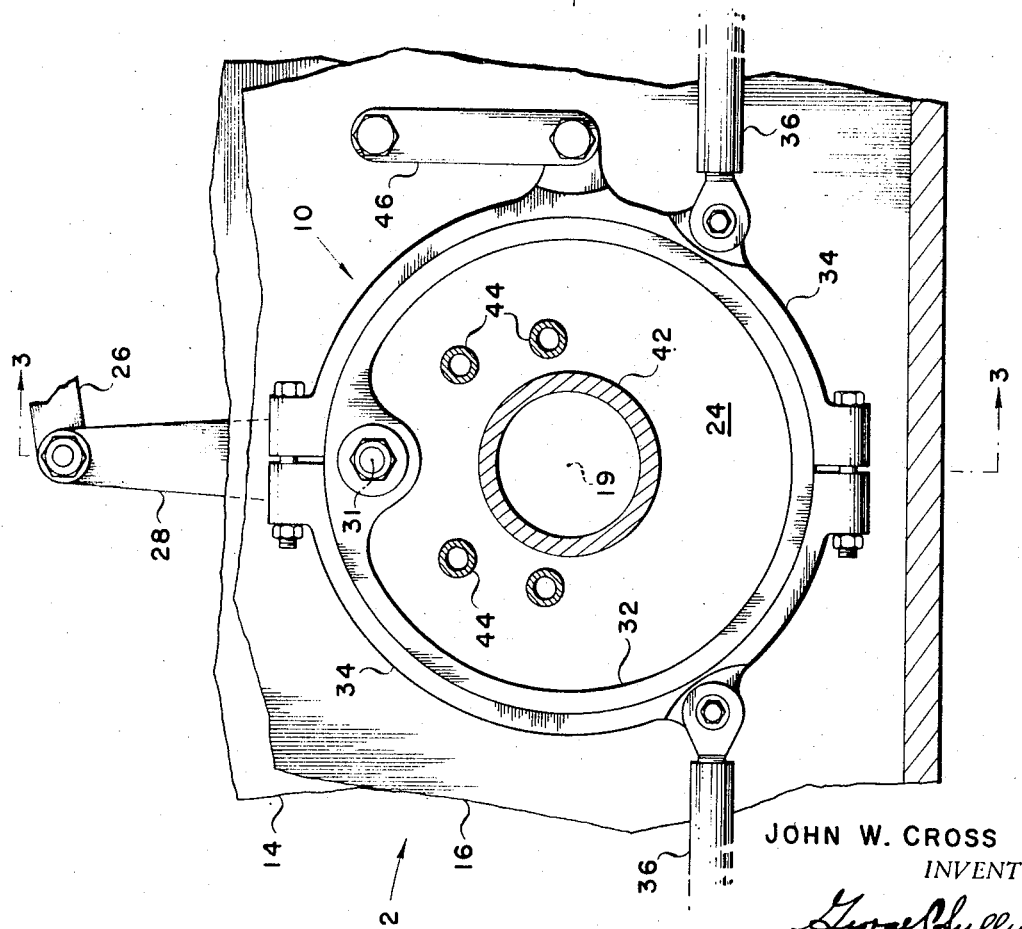
FIG. 2 is a front plan view transverse the vehicle roll axis of the steering arrangement of FIG. 1 with neutral (straight ahead) steering.

Referring to the drawings, FIG. 1 - 5, there is shown therein an exemplary steering arrangement 10 in accordance with the present invention. The steering arrangement 10 is applicable to almost any type of vehicle with two or more pivotably interconnecting chassis portions. Accordingly, only a portion of an exemplary vehicle 12 sufficient to show the steering arrangement 10 thereon is illustrated here. Referring particularly to FIG. 1 and FIG. 3, it may be seen that the exemplary vehicle 12 here comprises a first chassis portion 14 rotatably connected to a second chassis portion 16 by an annular intermediate roll joint 18 shown in FIG. 3. The roll joint 18 provides relative rotation between the first and second chassis portions about an inter-chassis roll axis 19.

By means of the steering arrangement 10 vehicle wheels 20 (or other suitable ground engagement means) on the second chassis portion 16 may be directly, mechanically and positively steered by steering gear 22 on the first chassis portion 14 irrespective of the degree of roll between the first and second chassis portions. The steering gear 22 may be any conventional or suitable steering gear, and it will be appreciated that it may be additionally connected to other vehicle wheels on the first chassis portion 14 or other chassis portions. Only a single steering interconnection is illustrated here for clarity. It may be seen that the steering arrangement 10 provides a large open passageway 24 between the first and second chassis portions, extending along and surrounding the inter-chassis roll axis 19, in which passageway 24 an inter-chassis drive shaft 42 may be located.

Considering the main elements of the steering arrangement 10 in their connected sequence, it may be seen that steering motion by the operator of the steering gear 22 is transmitted by a link 26 to rotate a lever 28. The lever 28 is in turn connected to one end of a steering shaft 30, which is rotatably mounted about its own central axis 31 to the first chassis portion 14. The steering shaft 30 and its axis of rotation 31 extends into the second chassis portion 16 parallel to, but substantially spaced vertically above, the roll axis 19. The rotation of the steering shaft 30 about its axis 31 by the lever 28 provides transmission of the steering impulse through the roll joint 18 to the second chassis portion 16 and connects to an inner ring 32 mating with an outer ring 34. The outer ring 34 then connects with the wheel steering means 38 on the second chassis portion 16.

The inner ring 32 is secured to the opposite end of the steering shaft 30 from the lever 28, i.e., in the second chassis portion 16. It may be seen that the inner ring 32 here is a thin, large diameter hollow ring effectively constituting a steering lever normally concentrically surrounding the roll axis 19, transverse thereto. The steering shaft 30 is fastened to one side of (eccentrically of) the inner ring 32. The inner ring extends at right angles from the axis of rotation 31 of the steering shaft 30, toward, but spaced from (around) the roll axis 19.

Figure 5:
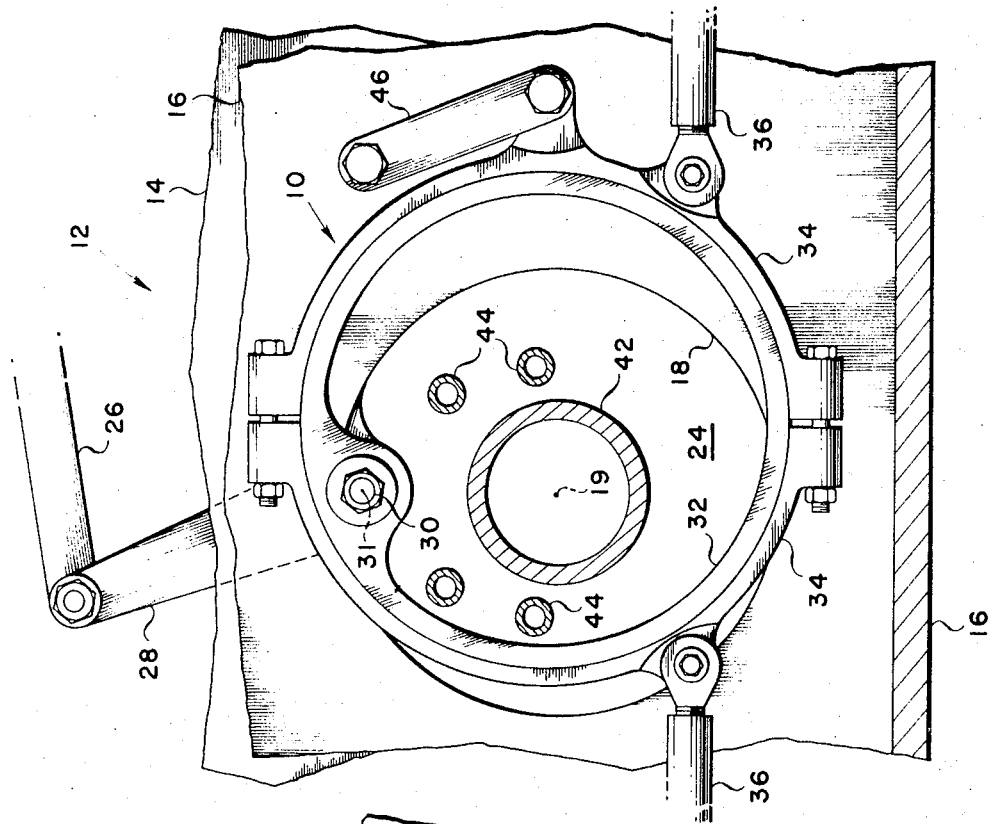
FIG. 5 is the same view as FIG. 2 but showing a positive steering input to the steering apparatus.

As may be seen from FIG. 5, rotation of the inner ring 32 by the steering shaft 30 causes a lateral translation of the inner ring 32 about the axis 31 relative to the roll axis 19. The outer ring 34 rotatably closely surrounds the inner ring 32 and therefore is translated therewith. This outer ring 34 constituting a rotatable connector means is mounted to the second chassis portion 16 for such steering translational movement only. Its outer edge thus may be connected to conventional connecting rods 36 at each side, which conventionally impart steering movement to the vehicle wheels 20 through conventional wheel steering means 38.

Figure 4:
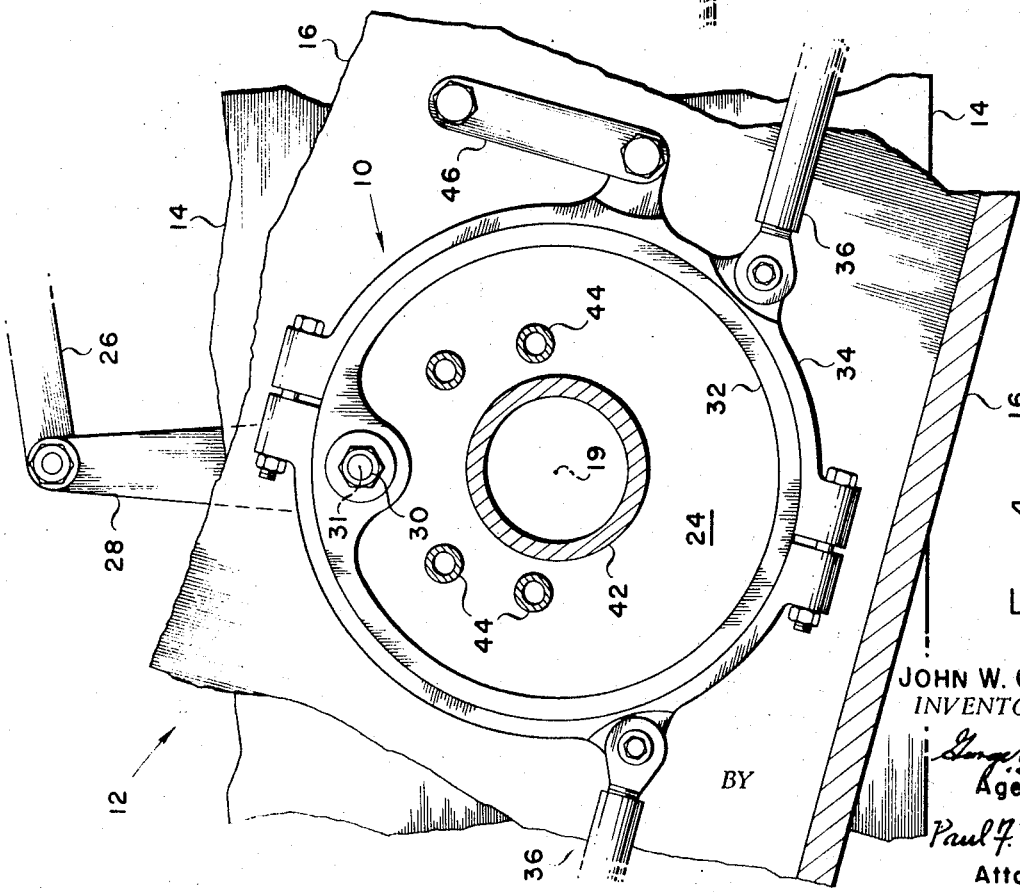
FIG. 4 is the same view as FIG. 2 but showing the position of the steering apparatus witn neutral steering but interchassis roll of the vehicle.

Considering in greater detail the inner ring 32 and the outer ring 34 and their interconnection, it may be seen that they together provide a rotational bearing and an uninterrupted passageway 24 along the inner-chassis roll axis 19. As shown in FIG. 3, they require little additional space since they are concentric with, closely spaced from, and parallel to, the roll joint 18. The inner ring 32 operates as a hollow steering lever or round eccentric cam acting about the axis of rotation 31 of the steering shaft 30. A cylindrical bearing surface 40 on the outer periphery of the inner ring or steering lever 32 mates within a correspondingly cylindrical bearing surface on the inner periphery of the outer ring 34. The cylindrical bearing surface 40 has its geometric center directly concentric the roll axis 19 when the steering gear 22 is in its neutral position. Thus, as illustrated in FIG. 4, the inner ring 32 and outer ring 34 are freely relatively rotatable with respect to one another about the roll axis 19. When one chassis portion rolls relative to the other, the inner ring 32 simply freely concentrically rotates within the outer ring 34 without imparting any translational movement thereto and therefore without imparting any steering movement to the vehicle wheels 20.

Considering now the situation where a steering movement is imparted through the steering gear 22 for turning the vehicular wheels 20, it may be seen from FIG. 5 for example that, in addition to any roll rotation about the roll axis 19, that the inner ring or steering lever 32 now additionally rotates about the axis of rotation 31 on the steering shaft 30. This steering rotation does impart a movement to the outer ring 34 because this rotation is not concentric with respect to the outer ring 34. Thus for steering movements the inner ring 32 acts as an eccentrically mounted cam and the outer ring 34 acts as a cam follower translated thereby. The extent of this translation is a function of the degree of rotation of the steering shaft 30 and the effective lever arm provided by the spacing between the axis of rotation 31 and the roll axis 19. I.e., in steering the inner ring 32 acts as a lever extending from the axis of rotation 31 down toward, and effectively geometrically acting at, the roll axis 19 but without actually physically occupying the space adjacent the roll axis 19.

A principal advantage, in addition to the extreme compactness of the steering arrangement 10, is the useable space provided directly at and adjacent the roll axis 19 between the two chassis portions by the passageway 24. This allows an interchassis drive shaft 42 to pass through this passageway 24 along the exact roll axis 19, simplifying the drive train arrangement. Additionally, innerchassis hydraulic lines 44 and other interchassis connection may be conveniently provided between the two chassis portions, without interference by interchassis roll, by passing them through the enclosed, and therefore protected, passageway 24 at or directly adjacent the roll axis 19. Where the drive shaft 42 is concentric the roll axis 19 the hydraulic lines 44 may be simply spaced conveniently closely around the drive shaft 42 within the passageway 24 as shown.

The outer ring 34 is pivotably mounted to a second chassis portion 16 so as to be moveable only in the desired steering translational movement. That is, the outer ring 34 is mounted so that it is free to move only along a single generally linear axis transverse the roll axis 19, substantially along the lines of the connecting rods 36. This is accomplished here by a parallelogram linkage relationship. A vertical arm 46 pivotably connects at its opposite ends between the second chassis 16 and the outer periphery of the outer ring 34. It may be seen that the arm 46 is parallel to, spaced from, and the same length as, the effective lever arm of the inner ring 32 between its axis of rotation 31 and the roll axis 19. Thus, a parallelogram linkage relationship is provided which directs the movement of the outer ring 34 only along a generally horizontal axis transverse the roll axis 19.

It may be seen that there has been described here an improved steering arrangement and steering interconnection means for a vehicle having a plurality of interrotatable chassis portions. While the apparatus described herein is presently considered to be preferred, it is contemplated that other variations and modifications within the purview of those skilled in the art can be made. The following claims are intended to cover all such variations and modifications as fall within the true spirit and scope of the invention.

What is claimed is:

1. In a vehicle having at least first and second interconnecting chassis portions rotatable with respect to one another about an inter-chassis roll axis, and a steering arrangement wherein steering gear on said first chassis portion of said vehicle is positively, mechanically, steeringly connected to vehicular steering means on said second chassis portion, the improvement in said steering arrangement of steering inter-connection means between said first and second chassis portions comprising:

rotational bearing means providing an uninterrupted passageway along said inter-chassis roll axis between said first and second chassis portions, said bearing means having first and second bearing elements both spaced from said inter-chassis roll axis, said second bearing element being freely relatively rotatable with respect to said first bearing element about an axis of rotation which is normally concentric with said inter-chassis roll axis, said first bearing element connecting with said steering gear and being mounted for translation by said steering gear transversely of said inter-chassis roll axis, said second bearing element being rotatably mounted to said first bearing element for corresponding translation by said first bearing element transversely of said inter-chassis roll axis;

and connecting means connecting said second bearing element with said vehicular steering means on said second chassis portion;

whereby said steering arrangement is substantially unaffected by inter-chassis rotation.

2. The steering arrangement of claim 1 wherein said first and second bearing elements are rotatably mating concentric annular rings.

3. The steering arrangement of claim 1 wherein a inter-chassis vehicular drive shaft with an axis of rotation extending along said inter-chassis roll axis passes through said rotational bearing means.

4. The steering arrangement of claim 1 wherein vehicular inter-chassis electrical and hydraulic lines pass through said rotational bearing means adjacent said inter-chassis roll axis.

5. The steering arrangement of claim 1 wherein said second bearing element is mounted to said second chassis portion by connecting means providing freedom of movement of said second bearing element only along a generally linear axis transverse said inter-chassis roll axis.

6. In a vehicle having at least first and second interconnecting chassis portions rotatable with respect to one another about an inter-chassis roll axis, and a steering arrangement wherein steering gear on said first chassis portion of said vehicle is positively mechanically steeringly connected to vehicular wheel steering means on said second chassis portion, the improvement in said steering arrangement comprising:

a steering shaft rotatably connected to said steering gear on said first chassis portion, said steering shaft having an axis of rotation parallel to and spaced from said inter-chassis roll axis, said steering shaft extending from said first chassis portion to said second chassis portion continuously spaced away from said inter-chassis roll axis;

a steering lever at said second chassis portion connected to and rotated by said steering shaft, said steering lever extending from said axis of rotation of said steering shaft toward but spaced from said inter-chassis roll axis, said steering lever being connected to said vehicular wheel steering means on said second chassis portion for steering movement of said vehicular wheels;

and rotatable connector means rotatably interconnecting said steering lever with said vehicular wheel steering means effectively geometrically at said inter-chassis roll axis so that inter-chassis roll imparts substantially no steering movement to said vehicular wheel steering means, said rotatable connecting means imparting steering movement to said vehicular wheel steering means by rotation of said steering lever by said steering shaft about said axis of rotation of said steering shaft;

whereby said steering arrangement is substantially unaffected by said inter-chassis rotation.

7. The steering arrangement of claim 6 wherein:

said steering lever is an annular hollow ring extending around and spaced from said inter-chassis roll axis, said ring having a circular bearing surface with a geometric center normally at said inter-chassis roll axis, said ring being rotatable by said steering gear about said axis of rotation of said steering shaft to provide eccentric rotation of said bearing surface relative to said inter-chassis roll axis;

and wherein said rotatable connector means comprises a follower bearing on said second chassis portion spaced from said inter-chassis roll axis and engaging said bearing surface of said ring for translation of said follower bearing by said eccentric rotation of said bearing surface, said rotatable connector means providing free rotation of said ring without translation of said follower bearing for concentric rotation of said ring about said inter-chassis roll axis;

and wherein said follower bearing steeringly connects with said vehicular wheel steering means on said second chassis.

8. The steering arrangement of claim 7 wherein said follower bearing is mounted to said second chassis portion by connecting means providing freedom of movement of said follower bearing only along a generally linear axis transverse said inter-chassis roll axis.

9. The steering arrangement of claim 7 wherein said ring and said rotatable connector means provide a large uninterrupted open passageway along said inter-chassis roll axis between said first and second chassis portions.

10. The steering arrangement of claim 9 wherein a inter-chassis vehicular drive shaft with an axis of rotation concentric said inter-chassis roll axis passes through said passageway.

11. The steering arrangement of claim 10 wherein vehicular inter-chassis electrical and hydraulic lines pass through said passageway directly adjacent said drive shaft.

12. The steering arrangement of claim 6 wherein a inter-chassis vehicular drive shaft with a central axis continuously directly concentric said inter-chassis roll axis passes between said first and second chassis portions continuously spaced from said steering arrangement.

* * * * *